United States Patent [19]
Lockwood

[11] 3,841,563
[45] Oct. 15, 1974

[54] AUTOMATIC RESET REVERSING MECHANISM FOR SPRINKLERS

[76] Inventor: George H. Lockwood, 2125 N.E. 27th Dr., Wilton Manors, Fla.

[22] Filed: Nov. 12, 1973

[21] Appl. No.: 415,015

[52] U.S. Cl............................ 239/230, 239/DIG. 1
[51] Int. Cl.............................................. B05b 3/02
[58] Field of Search........................... 239/230–233, 239/DIG. 1

[56] References Cited
UNITED STATES PATENTS

| | | | |
|---|---|---|---|
| 2,228,720 | 1/1941 | Coles et al. | 239/230 |
| 2,586,517 | 2/1952 | Coles | 239/DIG. 1 X |
| 2,999,645 | 9/1961 | Kennedy | 239/230 |
| 3,051,396 | 8/1962 | McElhenie | 239/230 |

FOREIGN PATENTS OR APPLICATIONS

| 554,139 | 1/1957 | Italy | 239/233 |
|---|---|---|---|

Primary Examiner—Lloyd L. King
Assistant Examiner—Andres Kashnikow
Attorney, Agent, or Firm—Malin & Haley

[57] ABSTRACT

An automatic reset reversing mechanism that resets a sprinkler to its preset cycling path or arc after it is moved to a position outside of the preset cycling arc. The automatic reset reversing mechanism utilizes a single clutch tooth on a dog drum that supports the reversing dogs. The reversing dogs are adjustable on the dog drum into any desired angular position in order to preset the arc of movement of the cycling sprinkler nozzle. The base of the sprinkler includes a notch that mates with the single clutch tooth during normal reversing movement of the cycling sprinkler nozzle. The dog drum is also movable upwardly to remove the single clutch tooth from the mating notch when the sprinkler nozzle is moved forceably outside of the preset cycling arc. Further movement of the sprinkler nozzle will replace the clutch tooth in the mating notch to re-establish the original preset sprinkler nozzle cycling arc.

5 Claims, 3 Drawing Figures

AUTOMATIC RESET REVERSING MECHANISM FOR SPRINKLERS

BACKGROUND OF THE INVENTION

In the past, reversing mechanism included two reversing dogs adjustably mounted on a dog drum to preset the sprinkler nozzle's cycling arc. When the sprinkler nozzle is moved accidentally or maliciously outside of the preset arc, the sprinkler nozzle's preset cycling arc is permanently altered. The reversing dogs are moved from the preset position. Thereafter, water from the sprinkler nozzle is not distributed upon the desired area of the ground. Older sprinkler heads are easily damaged and their preset cycle are easily altered, thereby wasting valuable irrigation water and frequently creating hazards to personnel or traffic.

BRIEF DESCRIPTION OF ONE EMBODIMENT OF THE INVENTION

The sprinkler device includes a sprinkler base for receiving fluid, a sprinkler body and nozzle movably connected to the base for distributing the fluid, a reverse mechanism including a reverse lever movable with the reversing sprinkler body, a drive means or mechanism, and the automatic sprinkler reset mechanism. The reset mechanism includes a dog drum movably connected to the sprinkler base, and two reversing dogs adjustably mounted on the dog drum in order to preset the angular path of the reversing sprinkler body. The reversing dogs and dog drum are normally held in a fixed relation to the sprinkler base by means of a single clutch tooth on the dog drum mated in a notch in the sprinkler base. The single clutch tooth is normally held or biased in the mating notch in the sprinkler base. When the single clutch tooth is mated with the notch, the reversing lever rotating with the sprinkler body engages a reversing dog at the end of each half cycle of movement in order to actuate the sprinkler reversing mechanism. The reversing dogs are not moved from their preset position nor is the single clutch tooth removed from the base notch. Each time the sprinkler reversing mechanism is actuated it rotates the sprinkler body, conventionally connected to the sprinkler base, in the opposite direction, thereby distributing fluid over the prescribed area.

When the sprinkler body and the reversing lever are forceably turned by an outside force beyond the preset angular path, the relative position of the dog drum and reversing dogs remained fixed, but the dog drum and reversing dogs move relative to the sprinkler base and move upwardly from the sprinkler base removing the single clutch tooth out of the mating notch in the sprinkler base. The top of the single clutch tooth thereafter moves along a generally flat cam face on each side of the notch in the sprinkler base.

The frictional force necessary to move the dog drum with the single clutch tooth riding, out of the sprinkler base notch, on the flat upper surface of the sprinkler base is less than the force necessary to actuate the reversing mechanism when the reversing dogs contact the reversing lever. Therefore, the reversing lever connected to the sprinkler body and driven by the drive means will move the reversing dogs and dog drum through an angle up to 360° or until the single clutch tooth is placed back in the single notch in the sprinkler base. Thereafter, the reversing mechanism operates as before, between the preset reversing dogs that define the preset angular path. When the dog drum tooth is mated with the sprinkler base, the frictional force is great enough to actuate the reversing mechanism when a reversing dog contacts the reversing lever.

In accordance with these and other objects which will be apparent hereinafter, the instant invention will now be described with particular reference to the illustrated embodiment in the accompanying drawings. The illustrated embodiments are not meant to limit the claimed matter in this invention.

BRIEF DESCRIPTION OF THE INVENTION

DESCRIPTION OF ONE EMBODIMENT

Figure 1:
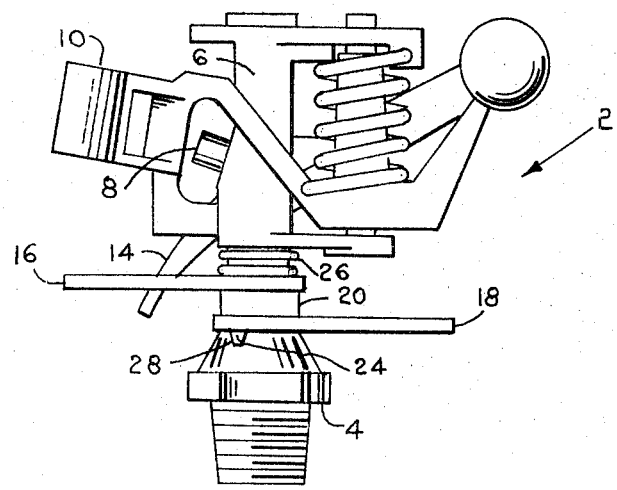
FIG. 1, is a side view of the automatic reset reversing mechanism sprinkler base and sprinkler nozzle.
Figure 2:
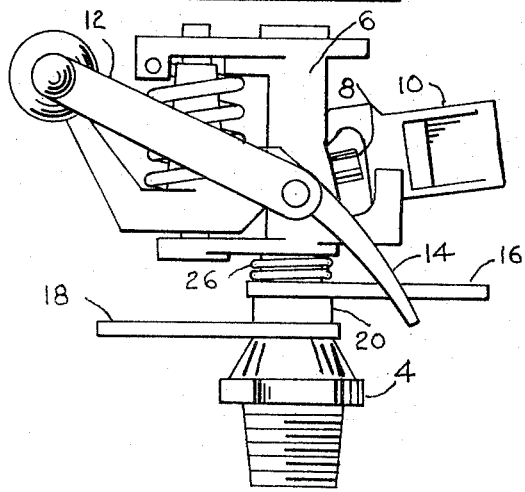
FIG. 2, is the opposite side view of the mechanism and sprinkler shown in FIG. 1, and FIG. 3, is another view of FIG. 1 with the dog drum tooth riding on ring-shaped surface 32, out of notch 28.
Figure 3:
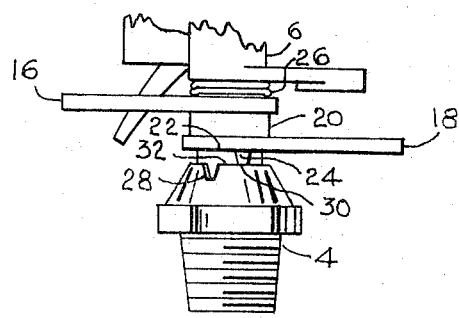

Referring now in detail to the drawing, wherein an embodiment of the invention is shown, the sprinkler device 2, includes a sprinkler base 4, and a movable sprinkler body 6. The sprinkler base 4 is held in a stationary position and receives fluid from a fluid supply pipe not shown. The sprinkler body 6 is rotatably connected to the sprinkler base 4 for distributing the fluid through the nozzle 8. The sprinkler body 6 is rotatably driven by a drive means in the well known manner by drive arm 10 and the direction of motion is reversed by the reverse mechanism generally designated by numeral 12. The reverse mechanism is operated by the reverse lever 14. Movement of the reverse lever 14 to cause a reversal of the direction of the driven sprinkler body 6 by the drive means is caused by reverse lever 14 contacting alternately the reverse dogs 16 and 18. The reverse dogs 16 and 18 are mounted on dog drum 20 and angularly adjustable to define the arcuate path of movement of the sprinkler body 6.

The dog drum 20 is movably connected to the sprinkler base 4. Dog drum 20 is rotatably about on the upper stem of the sprinkler base 4. The dog drum 20 includes a generally flat ring-shaped surface 22 with a single clutch tooth 24 projecting outwardly from the flat ring-shaped surface. A spring 26 exerts a force between sprinkler body 6 and dog drum 20, thereby holding clutch tooth 24 engaged in notch 28 in the sprinkler base 4, The torque required to cause the generally V-shaped clutch tooth 24 to move up and out of the notch 28 in the sprinkler base 4 is less than the frictional torque required to move the reversing dogs 16 and 18 on the dog drum 20 and is greater than the torque required to move the reversing lever 14 to actuate the reversing mechanism 12.

The reversing dogs 16 and 18 are adjustably mounted on the dog drum 20. The reversing dogs 16 and 18 are angularly adjustable on the dog drum in order to preset the sprinkler body cycling arc.

The dog drum 20 is movable upwardly against biasing spring 26 to disengage the single clutch tooth 24 from the mating notch 28 by rotating the sprinkler body in either direction beyond the preset cycling arc. To disengage the dog drum 20 by an outside force, the reversing lever 14 will first make contact with a reversing dog 16 or 18. Second, the reversing lever 14 will move, actuating the reversing mechanism 12. Thereafter, further movement of the reversing lever 14 in the same direction will force the dog drum tooth 24 out of the base notch 28. It should be noted that the preset reversing dogs 16 and 18 are held in their original position even though the sprinkler body 6 is moved outside of the preset cycling arc. The preset position of reversing dogs 16 and 18 are maintained because a greater torque is necessary to move the reversing dogs 16 and 18 from their preset position in relationship to the dog drum 20, than the torque necessary to move the single clutch tooth 24 out of the base notch 28 by caming a side of the single clutch tooth 24 against a side of the notch 28. The tooth 24 will rise out of the notch 28 until the base 30 of the tooth 24 rides freely about the flat generally horizontal surface 32 of the base 4.

Where ever the tooth 24 is positioned on surface 32, when the outside force is disengaged or removed, the drive means will continue to operate, causing the body 6 to rotate, moving the dogs 16 and 18 and dog drum 20 around until the clutch tooth 24 re-engages in notch 28 and the preset cycle is resumed.

It should be noted that this invention may be incorporated into any type of reversing sprinklers, such as, a ball-driven sprinkler, or turbine sprinkler. This device is not limited to the particular sprinkler shown in the drawings herein. This automatic reset reversing mechanism for sprinklers may also be incorporated with sprinklers having various types of sprinkler reversing mechanisms.

The instant invention has been shown and described herein in what is considered to be one usable embodiment at the present time. It is recognized, however, that departures may be made therefrom within the scope of the invention and that obvious modifications will occur to a person skilled in the art and that the illustrations herein do not limit the scope of the claimed subject matter.

What I claim is:

1. An adjustable path repetitive reversing sprinkler including a movable nozzle for distributing fluid and a drive means, wherein the improvement of the adjustable path repetitive reversing sprinkler comprises:
a memory device connected to said sprinkler allowing said nozzle to move outside of a preset repetitive adjustable path, said memory device including means to return and re-establish the sprinkler movement in said preset sprinkler nozzle path.

2. An automatic reset sprinkler device that allows an adjustable path-reversing sprinkler to automatically reset to the sprinkler nozzle path previously set after movement of the sprinkler nozzle outside of the preset nozzle cycling path comprising;
a sprinkler for distributing fluid, said sprinkler including a movable nozzle,
an adjustable path-reversing mechanism connected to said sprinkler to control the sprinkler nozzle in a preset repetitive reversing path,
a sprinkler drive means connected to said sprinkler, and
an automatic reset sprinkler memory device connected to said sprinkler, said memory device including a clutch means to allow said nozzle to move outside of the preset nozzle path, said memory device including means to re-establish movement in the said preset sprinkler nozzle path.

3. A sprinkler with automatic reset reversing mechanism that allows the sprinkler to reset the sprinkler nozzle to its preset cycle after movement of the sprinkler nozzle to a position outside of its preset cycle path comprising;
a general stationary sprinkler base,
a sprinkler body having a nozzle for distributing fluid, said body movably connected to said base,
a drive means connected to said body for driving said body,
an automatic sprinkler reversing mechanism connected to said drive means for reversing the direction of said sprinkler body, said reversing mechanism including a reversing lever for operating said reversing mechanism,
reversing dogs mounted on a dog drum and in the path of said reversing lever in order to reverse the motion of the sprinkler nozzle in a preset repeating cycle,
a clutch means connecting said dog drum and said base, the two halves of said clutch means engageable in only one relative position, said clutch remaining in the engaged position during normal operation and reverse cycling, said clutch automatically disengaging and leaving said preset reversing dogs held in the preset position relative to said dog drum when the sprinkler body is forced to move outside of the preset cycling path, thereafter continued movement of said sprinkler body by the drive means replaces the clutch to the engaged position to re-establish the original preset cycling.

4. A sprinkler comprising;
a generally stationary base,
a sprinkler body with a nozzle rotatably mounted on said stationary base,
a drive means connected to said sprinkler body,
a reverse mechanism for reversing the direction of rotation of said driven body,
an adjustable reversing means for operating said reverse mechanism thereby setting the limits of movement of said body during its arcuate cycle movement, and
a device for automatically resetting said body and nozzle after movement out of the preset arcuate path while maintaining the preset position of said adjustable reversing means when said body is moved out of the preset arcuate path, said device including means to re-establish the relative position of the adjusted reversing means and the base.

5. A sprinkler as set forth in claim 4 wherein;
said device for automatic resetting is a torque limiting clutch coupling the carrier member for said adjustable reversing means to a basically stationary member, said clutch requiring more torque for disengagement than is required for normal shifting of said reverse mechanism by said reversing means, and said clutch requiring less torque to rotate after disengagement than is required for normal shifting of said reverse mechanism by said reversing means.

* * * * *